April 16, 1940.  E. M. SARGENT  2,197,159

GLOBE MOUNT

Original Filed Nov. 20, 1936

INVENTOR,
EDWARD M. SARGENT.
BY Lippincott & Metcalf
ATTORNEYS.

Patented Apr. 16, 1940

2,197,159

UNITED STATES PATENT OFFICE 2,197,159

GLOBE MOUNT

Edward M. Sargent, Oakland, Calif.

Application November 20, 1936, Serial No. 111,911
Renewed August 20, 1937

1 Claim. (Cl. 35—46)

My invention relates to globe mounts and more particularly to a mounting for a globe carrying a map of the world so mounted that great circle distances between any two points on the globe may be readily and quickly measured.

The main object of my invention is to provide a globe mount whereby great circle distances between any two points on a map mounted on the globe may be quickly determined.

Other objects of my invention will be apparent or will be specifically pointed out in the description forming a part of this specification, but I do not limit myself to the embodiment of the invention herein described, as various forms may be adopted within the scope of the claim.

Referring to the drawing.

Figure 1:
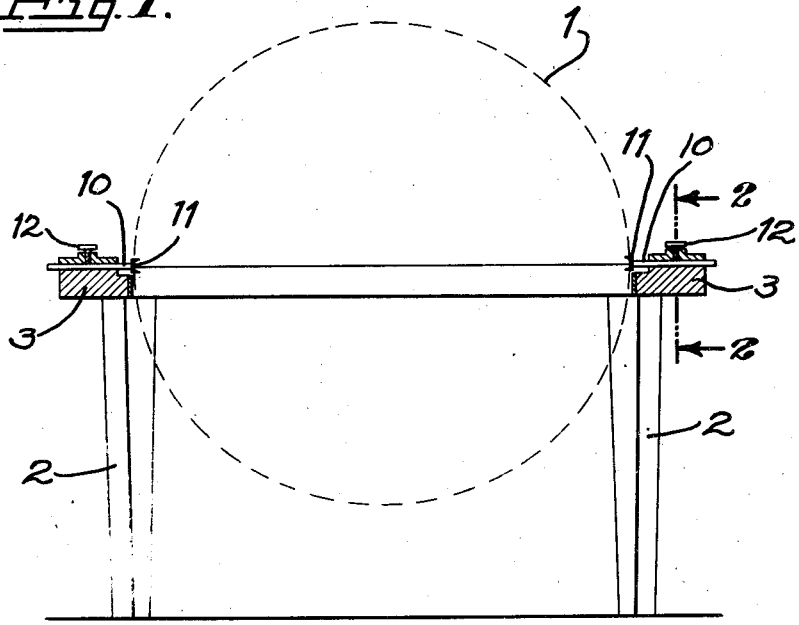
Figure 1 is a partly in section and partly in elevation, view showing the globe mount of my invention with the globe position indicated.
Figure 2:
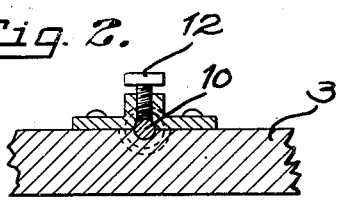
Figure 2 is a detailed section taken as indicated by the line 2—2 in Figure 1.
Figure 3:
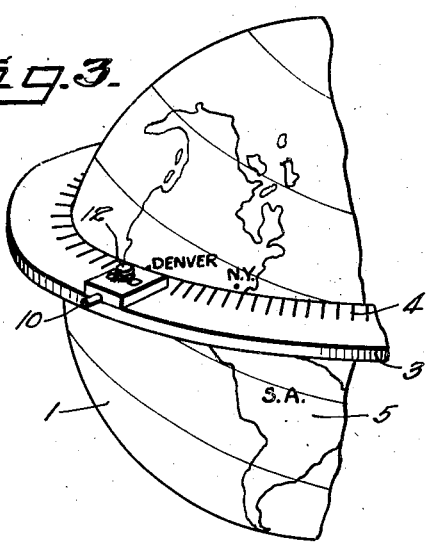
Fig. 3 is a perspective view showing use of globe.
Figure 4:
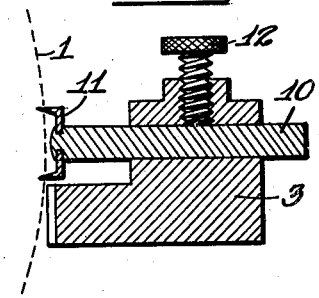
Fig. 4 is an enlarged detail in section of the axis pin and globe engaging portions defining the rotational axis of the globe.

As my improved globe mounting is adaptable for the measurement of distances between any two points on the globe, it is particularly desirable for use in amateur radio stations where the operator is communicating with other stations at a distance and in various countries of the earth.

My invention may be more fully understood by direct reference to the drawing.

Legs 2 are provided supporting a great circle ring 3, having thereon a mileage scale 4. A globe 1 is also provided fitting into the great circle ring. I prefer to have the globe carry a map 5 of the world.

The globe is preferably sold to the user free from the mount. When the globe is received by the user, he locates his own position on the globe and then creates an axis through the globe passing through his position by attaching to the globe opposed axis pins 10 having a rotatable end portion 11 engaging the globe. The axis pins are maintained in engagement with the globe by set screws 12. It is obvious that the globe engaging portions 11 may be of various types, such as having sharp points entering the globe as illustrated, or they may be vacuum cups of small diameter so that the globe surface is not injured.

It will be obvious, however, that sale of the globe to users in specific localities may be made with the axis already fixed and passing through that particular locality.

With a fixed axis once provided passing through the particular location from which distance is desired, one complete rotation of the globe will bring all other points on the earth in line with the scale 7 on the ring. In this particular regard it will be obvious that one or the other of the axis pins will be chosen as entering the globe at the locality from which distance is desired, and that the scale of miles should start at this pin.

It is also obvious, in case the user of the globe moves his location, that the axis pins may be withdrawn, the globe turned, and the axis pins reinserted in accordance with the new location.

It will thus be seen that I have provided a relatively cheap and efficient means of measuring distances on a globe carrying the map of the world and the word "globe" is used in this specification to mean sphere carrying a map on which distances are to be measured.

I claim:

In combination, a geographical globe having a world map thereon, and a mounting therefor comprising a fixed ring having an aperture of substantially great circle diameter, and a pair of opposed polar pivots mounted on said ring, each pivot having a globe engaging portion mounted thereon, said pivots being movable to cause engagement of said globe in line with any axis thereof, said globe engaging portions being rotatable on said pivots after engagement to allow rotation of said globe on the axis defined by said engagement, said fixed ring having a scale of miles thereon beginning at one of said globe engaging members.

EDWARD M. SARGENT.